United States Patent [19]
O'Dell

[11] Patent Number: 6,067,938
[45] Date of Patent: May 30, 2000

[54] MODULARLY STACKABLE CENTRALLY VENTILATED BIRD HOUSE

[76] Inventor: James E. O'Dell, P.O. Box 128, Morley, Mo. 63767

[21] Appl. No.: 09/368,909

[22] Filed: Aug. 7, 1999

[51] Int. Cl.⁷ .................................................. A01K 31/00
[52] U.S. Cl. ............................................................ 119/428
[58] Field of Search ................... 119/57.8, 428, 119/429, 432

[56] References Cited

U.S. PATENT DOCUMENTS

| | | | |
|---|---|---|---|
| D. 335,724 | 5/1993 | Coffer | D30/110 |
| D. 347,302 | 5/1994 | Maple | D30/110 |
| D. 358,907 | 5/1995 | Spivey | D30/110 |
| D. 370,311 | 5/1996 | Logan, Jr. | D30/110 |
| D. 370,745 | 6/1996 | Madigan | D30/110 |
| 2,236,593 | 4/1941 | Booth | 119/432 X |
| 3,696,792 | 10/1972 | Bruhns | 119/428 X |
| 3,818,868 | 6/1974 | Boehland, Jr. | 119/432 |
| 5,740,762 | 4/1998 | Bennett | 119/428 |
| 5,943,981 | 8/1999 | Chrisco | 119/428 |

*Primary Examiner*—Robert P. Swiatek
*Attorney, Agent, or Firm*—Richard L. Miller, P.E.

[57] ABSTRACT

A modularly stackable centrally ventilated bird house that includes a main portion, a ventilation system, and a base. The main portion includes a lowermost floor, corner posts, lower peripheral perches, a pair of lower internal perches, an uppermost floor, upper peripheral perches, a pair of upper internal perches, and a ceiling. The ventilation system includes a stub venting-tube that together with a throughbore in the lower floor allow the modularly stackable centrally ventilated bird houses to be stacked, four lower compartments, four lower dowels, four upper compartments, four upper dowels, and a vent cap. The main portion further includes a pitched roof that is selectively disposed on the ceiling and which has a pair of gable ends that have vent throughbores therethrough. When the pitched roof is utilized, the vent cap is removed and air exiting the stub venting-tube exits through the vent throughbores in the pair of gable ends of the pitched roof and out into the ambient.

28 Claims, 2 Drawing Sheets

MODULARLY STACKABLE CENTRALLY VENTILATED BIRD HOUSE

BACKGROUND OF THE INVENTION

1. Field of the Invention

The present invention relates to a bird house. More particularly, the present invention relates to a modularly stackable centrally ventilated bird house.

2. Description of the Prior Art

Numerous innovations for bird houses have been provided in the prior art that will be described. Even though these innovations may be suitable for the specific individual purposes to which they address, however, they differ from the present invention.

A FIRST EXAMPLE, U.S. Pat. No. Des. 335,724 to Coffer teaches the ornamental design for the six hole bird house.

A SECOND EXAMPLE, U.S. Pat. No. Des. 347,302 to Maple teaches the ornamental design for a bird house.

A THIRD EXAMPLE, U.S. Pat. No. Des. 358,907 to Spivey teaches the ornamental design for a bird house.

A FOURTH EXAMPLE, U.S. Pat. No. Des. 370,311 to Logan, Jr. teaches the ornamental design for a bird house.

A FIFTH EXAMPLE, U.S. Pat. No. Des. 370,745 to Madigan teaches the ornamental design for a bird house.

A SIXTH EXAMPLE, U.S. Pat. No. 5,740,762 to Bennett teaches a multi-compartment bird shelter that may be assembled with a minimum of mechanical fasteners and which may be assembled as a multi-tiered structure is disclosed. The shelter is supported, by a support flange, on a vertical pole and includes a plurality of individual compartment modules that are pie shaped with vertical divergingly spaced walls and a bottom surface. A spacer element place coaxially over the pole is larger than the pole so as to define a gap between the pole and the spacer element. The spacer element rests upon the support flange, and individual compartment modules are coupled to the pole by inserting a hook structure of the module into the gap defined between the pole and the spacer element. A plurality of like sized and shaped modules are arranged around the pole in side-by-side fashion and are similarly coupled to the pole so as to define a tier of compartments. Subsequent tiers of compartments may be similarly assembled atop existing tiers. A roof structure is placed over the topmost tier with the pole extending through a hole in the center of the roof. The roof structure secures the shelter in place and is itself held in place with a removable clamp that is attached to the pole above the roof. According to one feature of the disclosed shelter, individual compartment modules may be converted between a bird house configuration and a bird feeder configuration by coupling appropriate front panels to the front of the compartment module.

It is apparent that numerous innovations for bird houses have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a modularly stackable centrally ventilated bird house that avoids the disadvantages of the prior art.

ANOTHER OBJECT of the present invention is to provide a modularly stackable centrally ventilated bird house that is simple and inexpensive to manufacture.

STILL ANOTHER OBJECT of the present invention is to provide a modularly stackable centrally ventilated bird house that is simple to use.

BRIEFLY STATED, YET ANOTHER OBJECT of the present invention is to provide a modularly stackable centrally ventilated bird house that includes a main portion, a ventilation system, and a base. The main portion includes a lowermost floor, corner posts, lower peripheral perches, a pair of lower internal perches, an uppermost floor, upper peripheral perches, a pair of upper internal perches, and a ceiling. The ventilation system includes a stub venting-tube that together with a throughbore in the lower floor allow the modularly stackable centrally ventilated bird houses to be stacked, four lower compartments, four lower dowels, four upper compartments, four upper dowels, and a vent cap. The main portion further includes a pitched roof that is selectively disposed on the ceiling and which has a pair of gable ends that have vent throughbores therethrough. When the pitched roof is utilized, the vent cap is removed and air exiting the stub venting-tube exits through the vent throughbores in the pair of gable ends of the pitched roof and out into the ambient.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures on the drawing are briefly described as follows:

FIG. 5 is an enlarged diagrammatic perspective view of the area generally enclosed by the dotted curve identified by arrow 5 in FIG. 2 of a typical compartment;

FIG. 6 is a diagrammatic front elevational view illustrating "N" levels of the present invention; and FIG. 7 is an enlarged diagrammatic cross sectional view taken on line 7—7 in FIG. 1 of the central vent.

Figure 1:
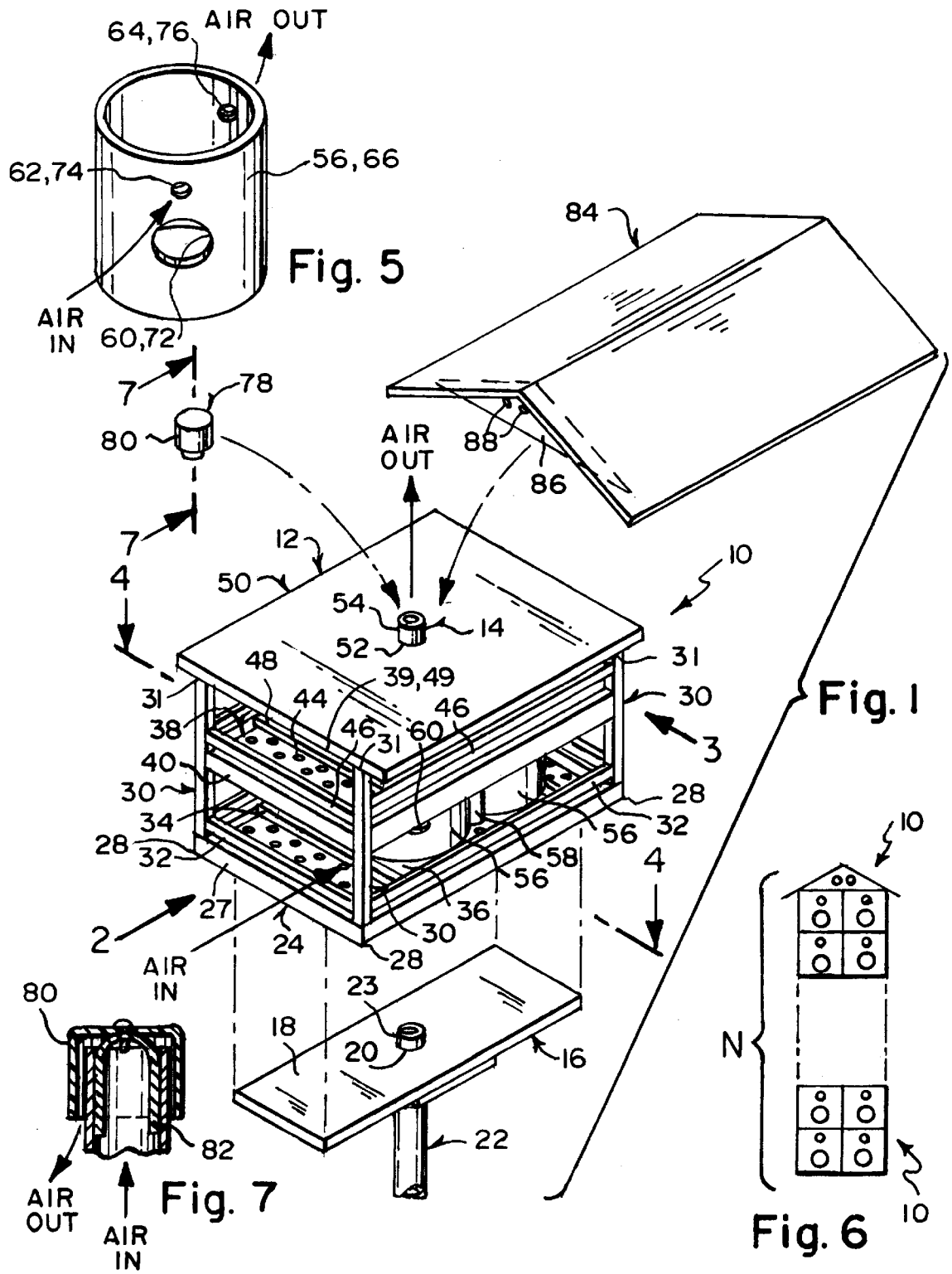
FIG. 1 is an exploded diagrammatic perspective view of the present invention.

LIST OF REFERENCE NUMERALS UTILIZED IN THE DRAWING 10 modularly stackable centrally ventilated bird house of the present invention
12 main portion for housing birds
14 ventilation system for providing ventilation for birds in main portion 12
16 base
18 pole mounting-plate of base 16
20 first post mounting-throughbore in pole mounting-plate 18 of base 16
22 post of base 16
23 exposed post portion of post 22 of base 16
24 lowermost floor of main portion 12
25 lower ventilation throughbores in lowermost floor 24 of main portion 12

26 second post mounting-throughbore in lowermost floor 24 of main portion 12
27 periphery of lowermost floor 24 of main portion 12
28 corners of lowermost floor 24 of main portion 12
29 drain holes in lowermost floor 24 of main portion 12
30 corner posts of main portion 12
31 uppermost terminal ends of corner posts 30 of main portion 12
32 lower peripheral perches of main portion 12
34 pair of lower internal perches of main portion 12
36 lower compartment holding space of main portion 12
38 uppermost floor of main portion 12
39 upper ventilation throughbore in uppermost floor 38 of main portion 12
40 periphery of uppermost floor 38 of main portion 12
42 corners of uppermost floor 38 of main portion 12
44 drain holes in uppermost floor 38 of main portion 12
46 upper peripheral perches of main portion 12
48 pair of upper internal perches of main portion 12
49 upper compartment holding space of main portion 12
50 ceiling of main portion 12
52 venting-throughbore in ceiling 50 of main portion 12
54 stub venting-tube of ventilation system 14 for allowing communication between upper compartment holding space 49 of main portion 12 and ambient
56 four lower compartments of ventilation system 14
57 lower ventilation space of ventilation system 14
58 four lower dowels of ventilation system 14
60 bird entering-throughbore in each lower compartment of four lower compartments 56 of ventilation system 14 for allowing entrance of birds into each lower compartment of four lower compartments 56 of ventilation system 14
62 air and light inlet-throughbore in each lower compartment of four lower compartments 56 of ventilation system 14 for allowing air and light to enter from ambient
64 air outlet-throughbore in each lower compartment of four lower compartments 56 of ventilation system 14 for allowing air entering through air and light inlet-throughbore 62 in associated lower compartment of four lower compartments 56 of ventilation system 14 to exit into lower ventilation space 57 of ventilation system 14 and up through upper ventilation throughbore 39 in uppermost floor 38 of main portion 12 and into upper compartment holding space 49 in main portion 12
66 four upper compartments of ventilation system 14
68 upper ventilation space of ventilation system 14
70 four upper dowels of ventilation system 14
72 bird entering-throughbore in each upper compartment of four upper compartments 66 of ventilation system 14 for allowing entrance of birds into each upper compartment of four upper compartments 66 of ventilation system 14
74 air and light inlet-throughbore in each upper compartment of four upper compartments 66 of ventilation system 14 for allowing air and light to enter from ambient
76 air outlet-throughbore in each upper compartment of four upper compartments 66 of ventilation system 14 for allowing air entering through air and light inlet-throughbore 74 in associated upper compartment of four upper compartments 66 of ventilation system 14 to exit into upper ventilation space 68 of ventilation system 14 and up through stub venting-tube 54 of ventilation system 14 and out into ambient
78 vent cap of ventilation system 14 for preventing rain from entering therein
80 inverted cup-shaped member of vent cap 78 of ventilation system 14
82 inverted U-shaped piece of springy material of vent cap 78 of ventilation system 14 for allowing air to exit therethrough and into ambient
84 pitched roof of main portion 12
86 pair of gable ends of pitched roof 84 of main portion 12
88 vent throughbores in pair of gable ends 86 of pitched roof 84 of main portion 12

DETAILED DESCRIPTION OF THE PREFERRED EMBODIMENT

Figure 2:
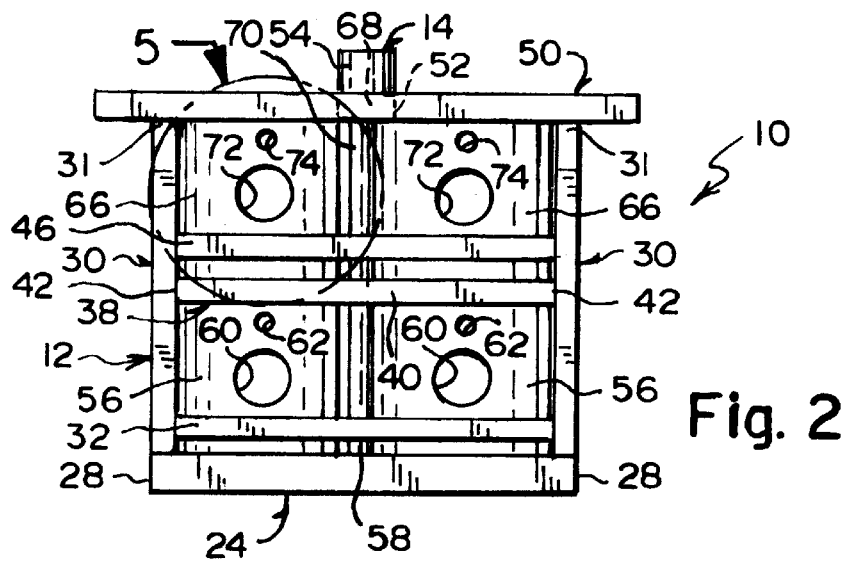
FIG. 2 is an enlarged diagrammatic end elevational view taken generally in the direction of arrow 2 in FIG. 1.
Figure 3:
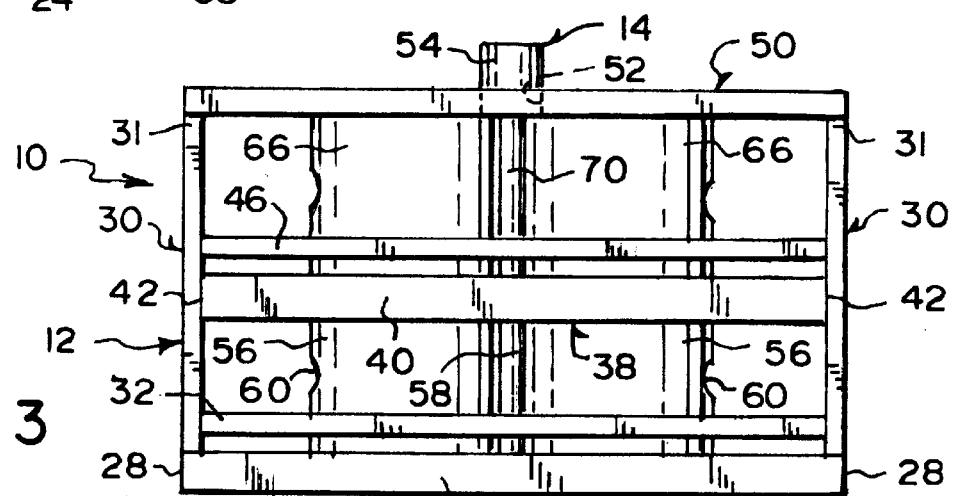
FIG. 3 is an enlarged diagrammatic side elevational view taken generally in the direction of arrow 3 in FIG. 1.
Figure 4:
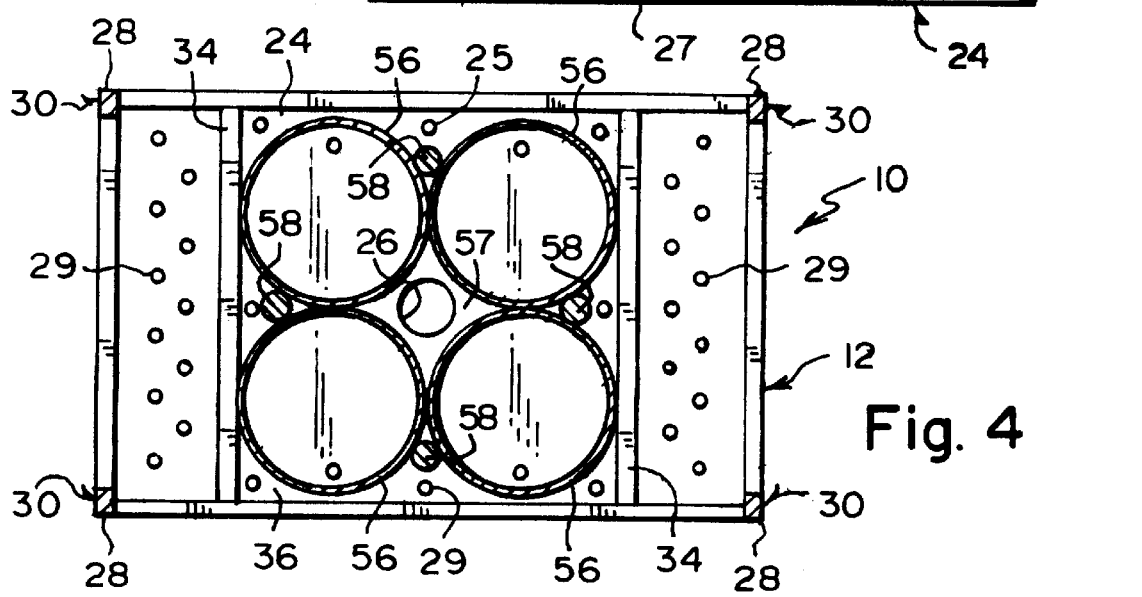
FIG. 4 is an enlarged diagrammatic cross sectional view taken on line 4—4 in FIG. 1.

Referring now to the figures, in which like numerals indicate like parts, and particularly to FIGS. 1–7, the modularly stackable centrally ventilated bird house of the present invention is shown generally at 10.

The modularly stackable centrally ventilated bird house 10 comprises a main portion 12 for housing birds, a ventilation system 14 associated with the main portion 12 for providing ventilation for the birds in the main portion 12, and a base 16 mounting the main portion 12.

The base 16 comprises a pole mounting-plate 18 that is flat and rectangular-shaped and has a first post mounting-throughbore 20 that extends centrally therethrough.

The base 16 further comprises a post 22 that extends through and partially past the first post mounting-throughbore 20 in the pole mounting-plate 18 of the base 16 so as to form an exposed post portion 23.

The main portion 12 comprises a lowermost floor 24 that rests on the pole mounting-plate 18 of the base 16 and has lower ventilation throughbores 25, a second post mounting-throughbore 26 that receives the exposed post portion 23 of the post 22 of the base 16, a periphery 27, corners 28, and drain holes 29.

The main portion 12 further comprises corner posts 30 that extend upwardly from the corners 28 of the lowermost floor 24 of the main portion 12, respectively, and terminate at uppermost terminal ends 31.

The main portion 12 further comprises lower peripheral perches 32 that connect the corner posts 30 of the main portion 12 to each other, aligned with and slightly above the periphery 27 of the lowermost floor 24 of the main portion 12.

The main portion 12 further comprises a pair of lower internal perches 34 that are parallel to each other, spaced-apart from each other, and extend transversely across the lowermost floor 24 of the main portion 12, from one long side of the lowermost floor 24 of the main portion 12 to the other long side of the lowermost floor 24 of the main portion 12, and define therebetween, a lower compartment holding space 36.

The main portion 12 further comprises an uppermost floor 38 that is disposed above, parallel to, and of a same configuration as the lowermost floor 24 of the main portion 12, and has an upper ventilation throughbore 39 that extends centrally therethrough, a periphery 40, corners 42, and drain holes 44.

The corners 42 of the uppermost floor 38 of the main portion 12 intersect the corner posts 30 of the main portion 12, respectively.

The main portion 12 further comprises upper peripheral perches 46 that connect the corner posts 30 of the main portion 12 to each other, aligned with and slightly above the periphery 40 of the uppermost floor 38 of the main portion 12.

The main portion 12 further comprises a pair of upper internal perches 48 that are parallel to each other, spaced-apart from each other, and extend transversely across the uppermost floor 38 of the main portion 12, from one long side of the uppermost floor 38 of the main portion 12 to the other long side of the uppermost floor 38 of the main portion 12, in alignment with the pair of lower internal perches 34 of the main portion 12, and define therebetween, an upper compartment holding space 49, with the upper ventilation throughbore 39 in the uppermost floor 38 of the main portion 12 allowing communication between the lower compartment holding space 36 of the main portion 12 and the upper compartment holding space 49 of the main portion 12.

The main portion 12 further comprises a ceiling 50 that extends across and overlaps the upper terminal ends 31 of the corner posts 30 of the main portion 12 and has a venting-throughbore 52 that extends centrally therethrough and which communicates with the upper compartment holding space 49 of the main portion 12.

The ventilation system 14 comprises a stub venting-tube 54 that extends from and communicates with the venting throughbore 52 in the ceiling 50 of the main portion 12 for allowing communication between the upper compartment holding space 49 of the main portion 12 and the ambient.

The stub venting-tube 54 of the ventilation system 14 of one modularly stackable centrally ventilated bird house 10 is received in the second post mounting-throughbore 26 in the lowermost floor 24 of the main portion 12 of another modularly stackable centrally ventilated bird house 10 when the modularly stackable centrally ventilated bird houses 10 are stacked.

The ventilation system 14 further comprises four lower compartments 56 that are tubular and are disposed in the lower compartment holding space 36 of the main portion 12 and extend vertically from the lowermost floor 24 of the main portion 12 to the uppermost floor 38 of the main portion 12.

The four lower compartments 56 of the ventilation system 14 contact each other so as to form a lower ventilation space 57 therebetween.

The four lower compartments 56 of the ventilation system 14 are maintained in position by four lower dowels 58 that extend vertically from the lowermost floor 24 of the main portion 12 to the uppermost floor 38 of the main portion 12.

The four lower dowels 58 of the ventilation system 14 contact and capture the four lower compartments 56 of the ventilation system 14 therebetween.

Each lower compartment of the four lower compartments 56 of the ventilation system 14 has a bird entering-throughbore 60 that extends laterally through a side thereof for allowing entrance of the birds into each lower compartment of the four lower compartments 56 of the ventilation system 14, and is disposed opposite to the lower ventilation space 57 of the ventilation system 14.

Each lower compartment of the four lower compartments 56 of the ventilation system 14 further has an air and light inlet-throughbore 62 that extends laterally through the side thereof, above the bird entering-throughbore 60 in an associated lower compartment of the four lower compartments 56 of the ventilation system 14 for allowing air and light to enter from the ambient.

Each lower compartment of the four lower compartments 56 of the ventilation system 14 further has an air outlet-throughbore 64 that extends laterally through another side thereof opposite to the air and light inlet-throughbore 62 in the associated lower compartment of the four lower compartments 56 of the ventilation system 14 and which communicates with the lower ventilation space 57 of the ventilation system 14 for allowing air entering through the air and light inlet-throughbore 62 in the associated lower compartment of the four lower compartments 56 of the ventilation system 14 to exit into the lower ventilation space 57 of the ventilation system 14 and up through the upper ventilation throughbore 39 in the uppermost floor 38 of the main portion 12 and into the upper compartment holding space 49 in the main portion 12.

The ventilation system 14 further comprises four upper compartments 66 that are tubular and are disposed in the upper compartment holding space 49 of the main portion 12, and extend vertically from the uppermost floor 38 of the main portion 12 to the ceiling 50 of the main portion 12, in alignment with the four lower compartments 56 of the main portion 12, respectively.

The four upper compartments 66 of the ventilation system 14 contact each other so as to form an upper ventilation space 68 therebetween.

The four upper compartments 66 of the ventilation system 14 are maintained in position by four upper dowels 70 that extend vertically from the uppermost floor 38 of the main portion 12 to the ceiling 50 of the main portion 12, in alignment with the four lower dowels 58.

The four upper dowels 70 of the ventilation system 14 contact and capture the four upper compartments 66 of the ventilation system 14 therebetween.

Each upper compartment of the four upper compartments 66 of the ventilation system 14 has a bird entering-throughbore 72 that extends laterally through a side thereof for allowing entrance of the birds into each upper compartment of the four upper compartments 66 of the ventilation system 14, and is disposed opposite to the upper ventilation space 68 of the ventilation system 14.

Each upper compartment of the four upper compartments 66 of the ventilation system 14 further has an air and light inlet-throughbore 74 that extends laterally through the side thereof above the bird entering-throughbore 72 in an associated upper compartment of the four upper compartments 66 of the ventilation system 14 for allowing air and light to enter from the ambient.

Each upper compartment of the four upper compartments 66 of the ventilation system 14 further has an air outlet-throughbore 76 that extends laterally through another side thereof opposite to the air and light inlet-throughbore 74 in the associated upper compartment of the four upper compartments 66 of the ventilation system 14 and communicates with the upper ventilation space 68 of the ventilation system 14 for allowing air entering through the air and light inlet-throughbore 74 in the associated upper compartment of the four upper compartments 66 of the ventilation system 14 to exit into the upper ventilation space 68 of the ventilation system 14 and up through the stub venting-tube 54 of the ventilation system 14 and out into the ambient.

The ventilation system 14 further comprises a vent cap 78 that replaceably snaps onto the stub venting-tube 54 for preventing rain from entering therein.

The vent cap 78 of the ventilation system 14 comprises an inverted cup-shaped member 80 that receives the stub venting-tube 54.

The vent cap 78 of the ventilation system 14 further comprises an inverted U-shaped piece of springy material 82 that depends from inside the inverted cup-shaped member 80 of the vent cap 78 of the ventilation system 14 and snapingly engages in the stub venting-tube 54 holding the inverted cup-shaped member 80 of the vent cap 78 of the ventilation system 14 so as to space the inverted cup-shaped member 60 of the vent cap 78 of the ventilation system 14 from the stub venting-tube 54 for allowing air to exit therethrough and into the ambient.

The main portion 12 further comprises a pitched roof 84 that is selectively disposed on the ceiling 50 of the main portion 12.

The pitched roof 84 of the main portion 12 comprises a pair of gable ends 86 that have vent throughbores 88 therethrough, and when the pitched roof 84 of the main portion 12 is utilized, the vent cap 78 of the ventilation system 14 is removed and air exiting the stub venting-tube 54 of the ventilation system 14 exits through the vent throughbores 88 in the pair of gable ends 86 of the pitched roof 84 of the main portion 12 and out into the ambient.

It will be understood that each of the elements described above, or two or more together, may also find a useful application in other types of constructions differing from the types described above.

While the invention has been illustrated and described as embodied in a modularly stackable centrally ventilated bird house, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A modularly stackable centrally ventilated bird house, comprising:
   a) a main portion for housing birds;
   b) a ventilation system associated with said main portion for providing ventilation for the birds in said main portion;
   c) a base mounting said main portion, wherein said base comprises a pole-mounting plate that is flat and rectangular-shaped and has a first post mounting-throughbore that extends centrally therethrough, wherein said base further comprises a post that extends through and partially past said first post mounting-throughbore in said pole-mounting plate of said base so as to form an exposed post portion, wherein said main portion comprises a lowermost floor that rests on said pole mounting-plate of said base and has:
      i) lower ventilation throughbores;
      ii) a second post mounting-throughbore that receives said exposed post portion of said post of said base;
      iii) a periphery;
      iv) corners; and
      v) drain holes, wherein said main portion further comprises corner posts that extend upwardly from said corners of said lowermost floor of said main portion, respectively, and terminate at uppermost terminal ends, wherein said main portion further comprises lower peripheral perches that connect said corner posts of said main portion to each other, and are aligned with and disposed slightly above said periphery of said lowermost floor of said main portion.

2. The house as defined in claim 1, wherein said main portion further comprises a pair of lower internal perches that are parallel to each other, spaced-apart from each other, and extend transversely across said lowermost floor of said main portion, from one long side of said lowermost floor of said main portion to the other long side of said lowermost floor of said main portion, and define therebetween, a lower compartment holding space.

3. The house as defined in claim 2, wherein said main portion further comprises an uppermost floor that is disposed above, parallel to, and of a same configuration as said lowermost floor of said main portion, and has:
   a) an upper ventilation throughbore that extends centrally therethrough;
   b) a periphery;
   c) corners; and
   d) drain holes.

4. The house as defined in claim 3, wherein said corners of said uppermost floor of said main portion intersect said corner posts of said main portion, respectively.

5. The house as defined in claim 3, wherein said main portion further comprises a pair of upper internal perches that are parallel to each other, spaced-apart from each other, and extend transversely across said uppermost floor of said main portion, from one long side of said uppermost floor of said main portion to the other long side of said uppermost floor of said main portion, and are in alignment with said pair of lower internal perches of said main portion, and define therebetween, an upper compartment holding space, with said upper ventilation throughbore in said uppermost floor of said main portion allowing communication between said lower compartment holding space of said main portion and said upper compartment holding space of said main portion.

6. The house as defined in claim 5, wherein said main portion further comprises a ceiling that extends across and overlaps said upper terminal ends of said corner posts of said main portion and has a venting-throughbore that extends centrally therethrough and which communicates with said upper compartment holding space of said main portion.

7. The house as defined in claim 6, wherein said ventilation system comprises a stub venting-tube that extends from and communicates with said venting throughbore in said ceiling of said main portion for allowing communication between said upper compartment holding space of said main portion and the ambient.

8. The house as defined in claim 7, wherein said stub venting-tube of said ventilation system of one modularly stackable centrally ventilated bird house is received in said second post mounting-throughbore in said lowermost floor of said main portion of another modularly stackable centrally ventilated bird house when said modularly stackable centrally ventilated bird houses are stacked.

9. The house as defined in claim 7, wherein said ventilation system further comprises four lower compartments that are tubular and are disposed in said lower compartment holding space of said main portion and extend vertically from said lowermost floor of said main portion to said uppermost floor of said main portion.

10. The house as defined in claim 9, wherein said four lower compartments of said ventilation system contact each other so as to form a lower ventilation space therebetween.

11. The house as defined in claim 10, wherein each lower compartment of said four lower compartments of said ventilation system has a bird entering-throughbore that extends laterally through a side thereof for allowing entrance of the birds into each lower compartment of said four lower compartments of said ventilation system, and which is disposed opposite to said lower ventilation space of said ventilation system.

12. The house as defined in claim 11, wherein each lower compartment of said four lower compartments of said ventilation system further has as air and light inlet-throughbore that extends laterally through said side thereof, above said bird entering-throughbore in an associated lower compartment of said four lower compartments of said ventilation system for allowing air and light to enter from the ambient.

13. The house as defined in claim 12, wherein each lower compartment of said four lower compartments of said ventilation system further has an air outlet-throughbore that extends laterally through another side thereof, opposite to said air and light inlet-throughbore in said associated lower compartment of said four lower compartments of said ventilation system and which communicates with said lower ventilation space of said ventilation system for allowing air entering through said air and light inlet-throughbore in said associated lower compartment of said four lower compartments of said ventilation system to exit into said lower ventilation space of said ventilation system and up through said upper ventilation throughbore in said uppermost floor of said main portion and into said upper compartment holding space in said main portion.

14. The house as defined in claim 9, wherein said four lower compartments of said ventilation system are maintained in position by four lower dowels that extend vertically from said lowermost floor of said main portion to said uppermost floor of said main portion.

15. The house as defined in claim 14, wherein said four lower dowels of said ventilation system contact and capture said four lower compartments of said ventilation system therebetween.

16. The house as defined in claim 14, wherein said ventilation system further comprises four upper compartments that are tubular and are disposed in said upper compartment holding space of said main portion, and extend vertically from said uppermost floor of said main portion to said ceiling of said main portion, and are in alignment with said four lower compartments of said main portion, respectively.

17. The house as defined in claim 16, wherein said four upper compartments of said ventilation system contact each other so as to form an upper ventilation space therebetween.

18. The house as defined in claim 17, wherein each upper compartment of said four upper compartments of said ventilation system has a bird entering-throughbore that extends laterally through a side thereof for allowing entrance of the birds into each upper compartment of said four upper compartments of said ventilation system, and is disposed opposite to said upper ventilation space of said ventilation system.

19. The house as defined in claim 18, wherein each upper compartment of said four upper compartments of said ventilation system further has an air and light inlet-throughbore that extends laterally through said side thereof above said bird entering-throughbore in an associated upper compartment of said four upper compartments of said ventilation system for allowing air and light to enter from the ambient.

20. The house as defined in claim 19, wherein each upper compartment of said four upper compartments of said ventilation system further has an air outlet-throughbore that extends laterally through another side thereof, opposite to said air and light inlet-throughbore in said associated upper compartment of said four upper compartments of said ventilation system and which communicates with said upper ventilation space of said ventilation system for allowing air entering through said air and light inlet-throughbore in said associated upper compartment of said four upper compartments of said ventilation system to exit into said upper ventilation space of said ventilation system and up through said stub venting-tube of said ventilation system and out into the ambient.

21. The house as defined in claim 16, wherein said four upper compartments of said ventilation system are maintained in position by four upper dowels that extend vertically from said uppermost floor of said main portion to said ceiling of said main portion, and are in alignment with said four lower dowels.

22. The house as defined in claim 21, wherein said four upper dowels of said ventilation system contact and capture said four upper compartments of said ventilation system therebetween.

23. The house as defined in claim 7, wherein said ventilation system further comprises a vent cap that replaceably snaps onto said stub venting-tube for preventing rain from entering therein.

24. The house as defined in claim 23, wherein said vent cap of said ventilation system comprises an inverted cup-shaped member that receives said stub venting-tube.

25. The house as defined in claim 24, wherein said vent cap of said ventilation system further comprises an inverted U-shaped piece of springy material that depends from inside said inverted cup-shaped member of said vent cap of said ventilation system and snapingly engages in said stub venting-tube holding said inverted cup-shaped member of said vent cap of said ventilation system so as to space said inverted cup-shaped member of said vent cap of said ventilation system from said stub venting-tube for allowing air to exit therethrough and into the ambient.

26. The house as defined in claim 7, wherein said main portion further comprises a pitched roof that is selectively disposed on said ceiling of said main portion.

27. The house as defined in claim 26, wherein said pitched roof of said main portion comprises a pair of gable ends that have vent throughbores therethrough, and when said pitched roof of said main portion is utilized, a vent cap of said ventilation system is removed and air exiting said stub venting-tube of said ventilation system exits through said vent throughbores in said pair of gable ends of said pitched roof of said main portion and out into the ambient.

28. The house as defined in claim 1, wherein said main portion further comprises upper peripheral perches that connect said corner posts of said main portion to each other, and are aligned with and disposed slightly above said periphery of said uppermost floor of said main portion.

* * * * *